March 7, 1967 T. H. BONN ET AL 3,307,556

UNIT RECORD PROCESSING APPARATUS

Filed Aug. 11, 1965 5 Sheets-Sheet 1

INVENTORS
THEODORE H. BONN
RAYMOND BROOKE
HERBERT A. GOLDMAN

BY Fred Jacob
ATTORNEY

March 7, 1967 T. H. BONN ET AL 3,307,556

UNIT RECORD PROCESSING APPARATUS

Filed Aug. 11, 1965 5 Sheets-Sheet 2

INVENTORS
THEODORE H. BONN
RAYMOND BROOKE
HERBERT A. GOLDMAN

BY Fred Jacob
ATTORNEY

UNIT RECORD PROCESSING APPARATUS

INVENTORS
THEODORE H. BONN
RAYMOND BROOKE
HERBERT A. GOLDMAN
BY Fred Jacob
ATTORNEY

UNIT RECORD PROCESSING APPARATUS

Filed Aug. 11, 1965 5 Sheets-Sheet 4

INVENTORS
THEODORE H. BONN
RAYMOND BROOKE
HERBERT A. GOLDMAN
BY Fred Jacob
ATTORNEY INVENTORS
THEODORE H. BONN
RAYMOND BROOKE
HERBERT A. GOLDMAN
BY Fred Jacob
ATTORNEY United States Patent Office 3,307,556

Patented Mar. 7, 1967

3,307,556

UNIT RECORD PROCESSING APPARATUS

Theodore H. Bonn, Lexington, Raymond Brooke, Newton Highlands, and Herbert A. Goldman, Winthrop, Mass., assignors to Honeywell Inc., Minneapolis, Minn., a corporation of Delaware Filed Aug. 11, 1965, Ser. No. 478,886
13 Claims. (Cl. 129—16.1)

The present invention relates in general to new and improved unit record processing apparatus, in particular to apparatus for selecting the unit records employed in a random access memory for systematically checking them for physical damage.

In random access memories which employ unit records, such records may consist of flexible cards or tape strips. Conventionally, these are vertically suspended in a stacked arrangement. Notches which are successively disposed along one edge of each card, are engaged by corresponding selection rods. The notch configuration and the selection rods cooperate to retain the card in place when the rods are in a predetermined rotational position. Specifically, the notches may include projections or tabs which are engaged by the corresponding rods in card-retaining relationship. The selection of a particular card is effected by rotating chosen ones of the aforesaid selection rods in accordance with a selection signal, such that all the selection rods engage the notches of the selected card in card-releasing relationship. The selected card then drops from the stack, whence it is transported to a data transfer station where the desired data transfer takes place.

Although the invention is not so limited, the cards may each have a magnetizable surface whereon information is magnetically recorded by means of discrete magnetized spots arranged in parallel tracks. The orders for the selection of a card and for the transfer of specific data relative thereto generally originate with a high-speed data processing system with which the subject card processing apparatus may be associated. After the desired data transfer has been effected, the card is transported to a position opposite the selection rods, whence it is returned to the latter and is again ready for selection.

The above-described card processing cycle must be carried out as rapidly as possible. This is particularly important where the above-described card processing apparatus is associated with a high-speed data processing system. At the high processing rates required, card damage frequently occurs, all precautions to the contrary notwithstanding. The notch portion, which constitutes the most frangible portion of the card is particularly vulnerable. The most common evidence of such damage is the breaking off of the aforesaid notch projections or tabs which prevents the selection rod that extends through this notch from engaging the latter in card-retaining relationship. In heretofore available card processing equipment of the tyre discussed herein, the notches represent a digital code which is unique for each card and which differs by a single digit from the successive card code. Thus, the loss of a notch tab ordinarily means that the card may be selected by more than one selection signal. Inevitably, this results in a false card selection, or worse, in a multiple card selection whereby more than one card is dropped in response to a selection signal. False and multiple card selections may also be evidence of notch wear. While such wear may be minimized, it cannot be completely eliminated. False card selections entail delays in the operation of the equipment. In multiple card selections the dropped cards are generally transported to the data transfer station at approximately the same time. This action may result in extensive damage, if not in the complete destruction of the multiple selected cards.

Heretofore, it was necessary to conduct a visual inspection of the individual cards in the card stack at periodic intervals in order to avoid the possibility of false or multiple card selections. Even in a relatively small stack of cards, e.g. one containing only fifty cards, this is a time-consuming procedure and requires that the cards be manually removed from the cartridge in which they are normally stacked. Such removal entails the possibility of damaging the sensitive, magnetizable card surface. Where a sizeable number of notches must be examined for each of fifty cards, a broken tab is not always obvious to the person inspecting it, particularly where the removed tab portion is small. For large card stacks containing hundreds of cards, the reliability of a visual inspection procedure is questionable at best.

It is the primary object of the present invention to provide card processing apparatus which is not subject to the foregoing disadvantages.

It is another object of the present invention to provide card processing apparatus wherein a non-selected card is normally retained by at least two selection rods.

It is still another object of the present invention to provide apparatus for testing the unit record cards of a random access card memory, which does not entail the manual removal of the cards from their normal storage location.

It is a further object of the present invention to provide apparatus for testing the individual cards of a random access card memory for physical damage, such test being independent of the skill or attention of the operator.

These and other objects of the present invention together with the features and advantages thereof will become apparent from the following detailed specification with reference to the accompanying drawings in which.

The invention will be explained with reference to a specific random access card memory wherein the cards are retained on the selection rods by a particular cross section of the latter which cooperates with a specific card notch configuration. It will be recognized, however, that the invention is not so limited and is applicable to all random access card memories of this general type.

Figure 1:
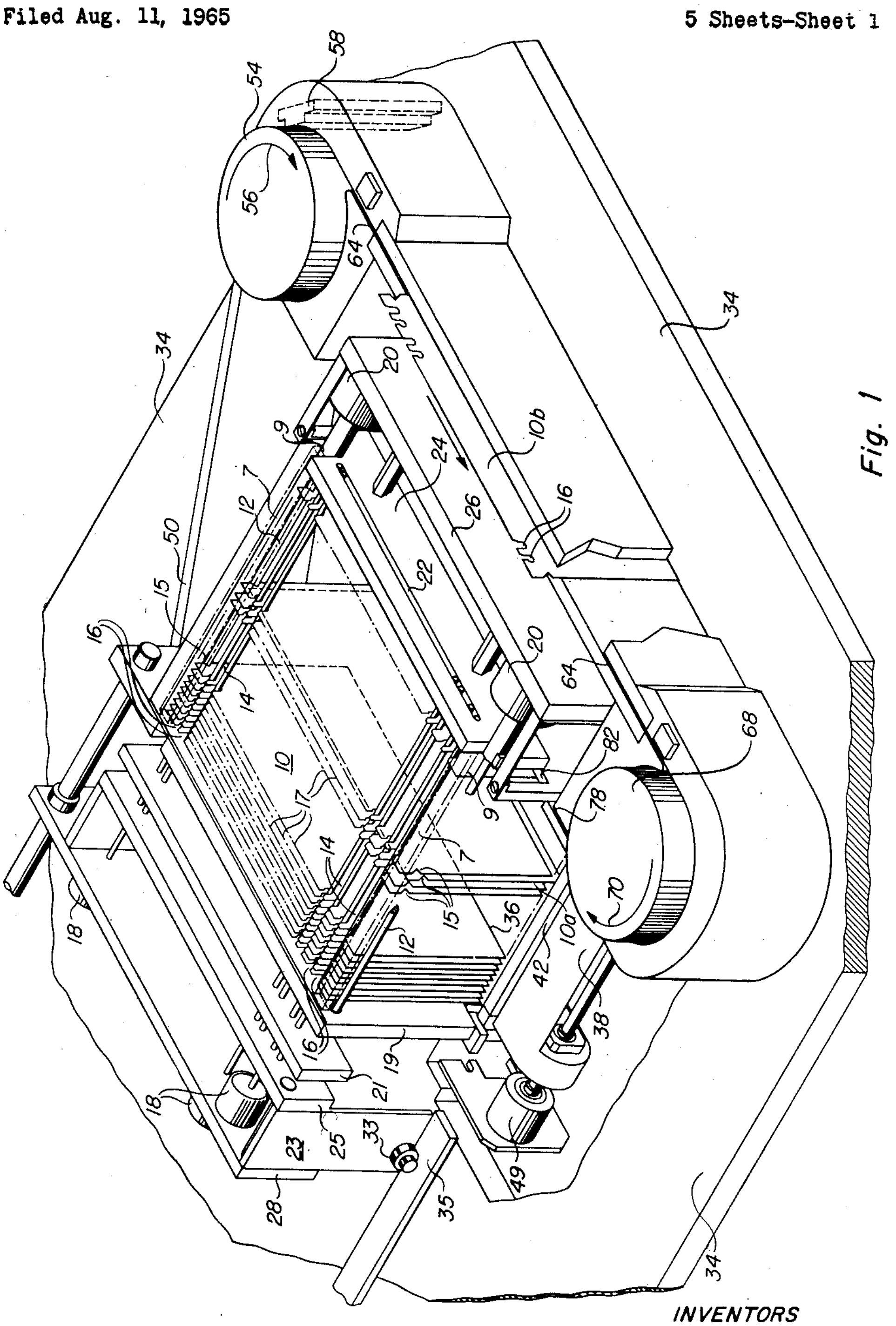
FIGURE 1 illustrates features of the present invention as applied to an exemplary random access card memory.

With reference now to the drawings, FIGURE 1 illustrates a stack of rectangular cards 10 having major card edges 17 disposed uppermost in a common horizontal plane. In actual practice the cards are stacked relatively uniformly and far more closely than can be shown with clarity in FIGURE 1. In places, cards have also been omitted in FIGURE 1 for the sake of illustrating pertinent details. Each card has successive pairs of notches 16 disposed along the upper card edge 17. For the sake of clarity, only three notch pairs are shown. It will be understood, however, that the number of notches is related to the number of cards in the stack from which a random selection is to be made.

The card notches 16 are seen to be aligned in rows for successive cards and are engaged by corresponding pairs of selection rods 14, one end of which is rotatably supported in a slot 22 of a fixed plate 24. The latter plate is fastened to a supporting plate 26 which is mounted on a working surface 34. The selection rods 14 extend through appropriate holes in a plate 19, an intermediate plate 21 and further through a front plate 25 of a carriage 23. The carriage 23 further includes a rear plate 28 having solenoid actuators 18 mounted on its front and rear surfaces respectively. The actuators 18 are seen to be coupled to the selection rods 14. For the sake of clarity, only three pairs of selection rods and their corresponding solenoid actuators are illustrated in FIGURE 1.

Figure 3:
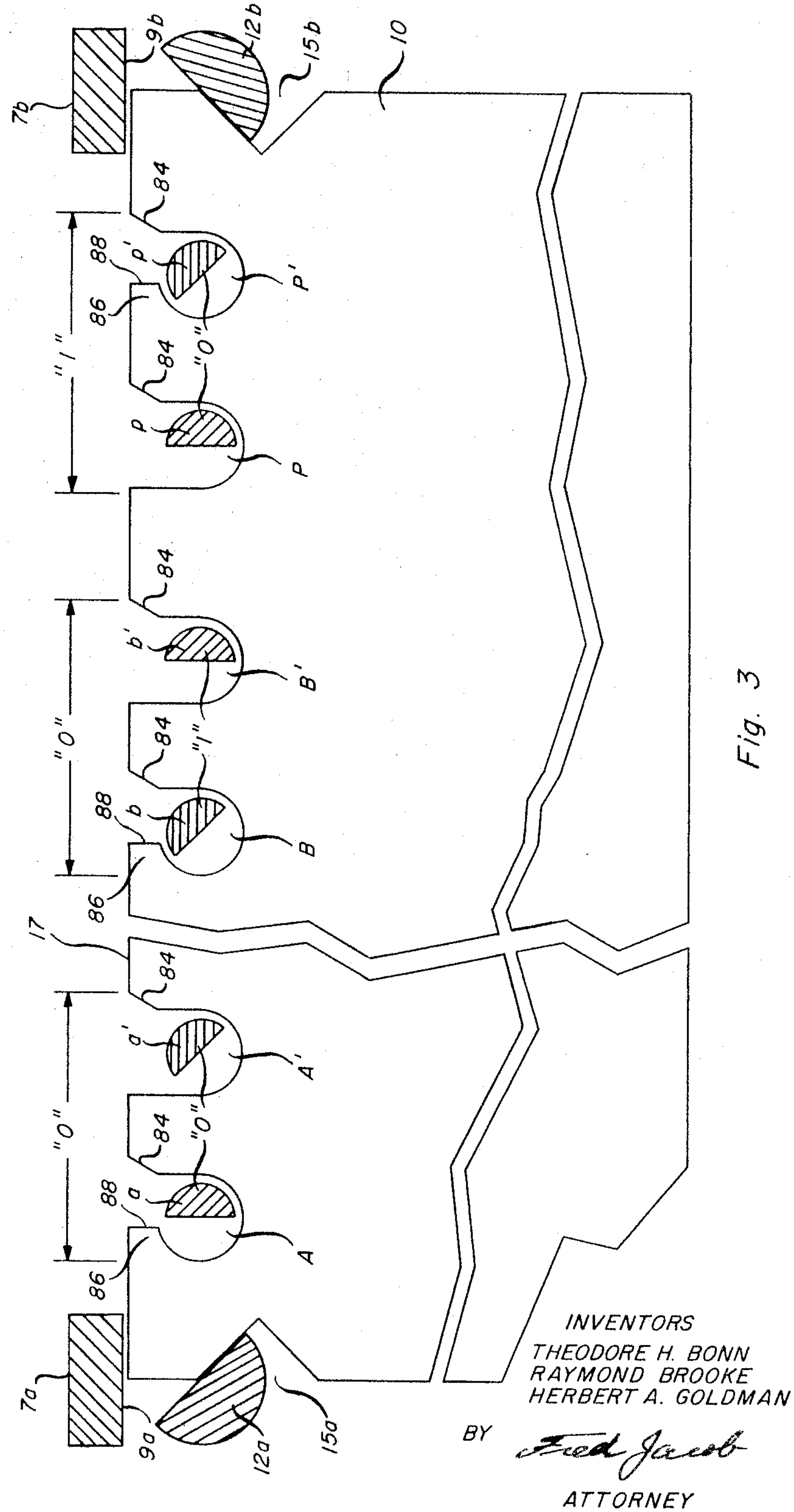
FIGURE 3 illustrates in detail certain aspects of a preferred embodiment of the present invention.

A pair of holding rods 12 is adapted to engage opposite notches 15 disposed in the side edges of the rectangular cards, near the upper edge 17. One end of each holding rod 12 is rotatably supported in the aforesaid plate 19, the other end being coupled to one of a pair of solenoid actuators 20 mounted on the plate 26. A pair of guides 7, shown in phantom outline in FIGURE 1 for the sake of clarity, is positioned above the card stack such that coplanar horizontal guide surfaces 9 are disposed immediately above the upper card edges 17. As best shown in FIGURE 3, the guide surfaces 9 straddle the side edges of the suspended cards 10 and are spaced from the upper card edges 17 to permit freedom of movement of the cards along the rods.

In their suspended position, the bottom edges 36 of the cards lie in a common horizontal plane which is uniformly spaced from a reference plane determined by the working surface 34. A waiting platform 38 includes a planar portion which lies in the aforesaid reference plane and which is positioned immediately below the suspended cards. A card selection is effected by energizing the solenoid actuators 18 in accordance with the received selection signal to rotate appropriate selection rods 14 to the card-releasing position with respect to the card notches 16 engaged thereby. Similarly, the solenoids 20 are energized to rotate the holding rods 12 out of engagement with the card slots 15. The selected card 10*a* then drops to the waiting platform, immediately in front of an impelling bar 42. The latter is driven forward by an appropriately coupled servo motor 49 and passes under the bottom edges 36 of the suspended cards to impart an acceleration to the selected card 10*a*. The aforesaid acceleration causes the selected card to move forward until it reaches a guide 50 under its own momentum. There it is deflected and subsequently travels to a vacuum read capstan 54 which rotates at a predetermined velocity in the direction of the arrow 56.

While being held in contact with the external surface of the capstan 54, the magnetic head 58 effects a data transfer of the magnetized card surface presented thereto. Upon command, the card is released from the read capstan 54 and travels down a raceway 64 as indicated at 10*b* in FIGURE 1. The card 10*b* ultimately reaches a vacuum return capstan 68 which rotates in the direction of the arrow 70 at a slower rate than the read capstan 54. The card is thus slowed down and its direction of travel is reversed by 180°. Upon being released from the return capstan by way of a raceway 78, the card arrives at a lift plate 82. There it is arrested, raised to a position opposite the rods and is then forced toward the latter until the selection rods 1 again engage corresponding card notches 16 and the holding rods 12 engage the slots 15.

Figure 2:
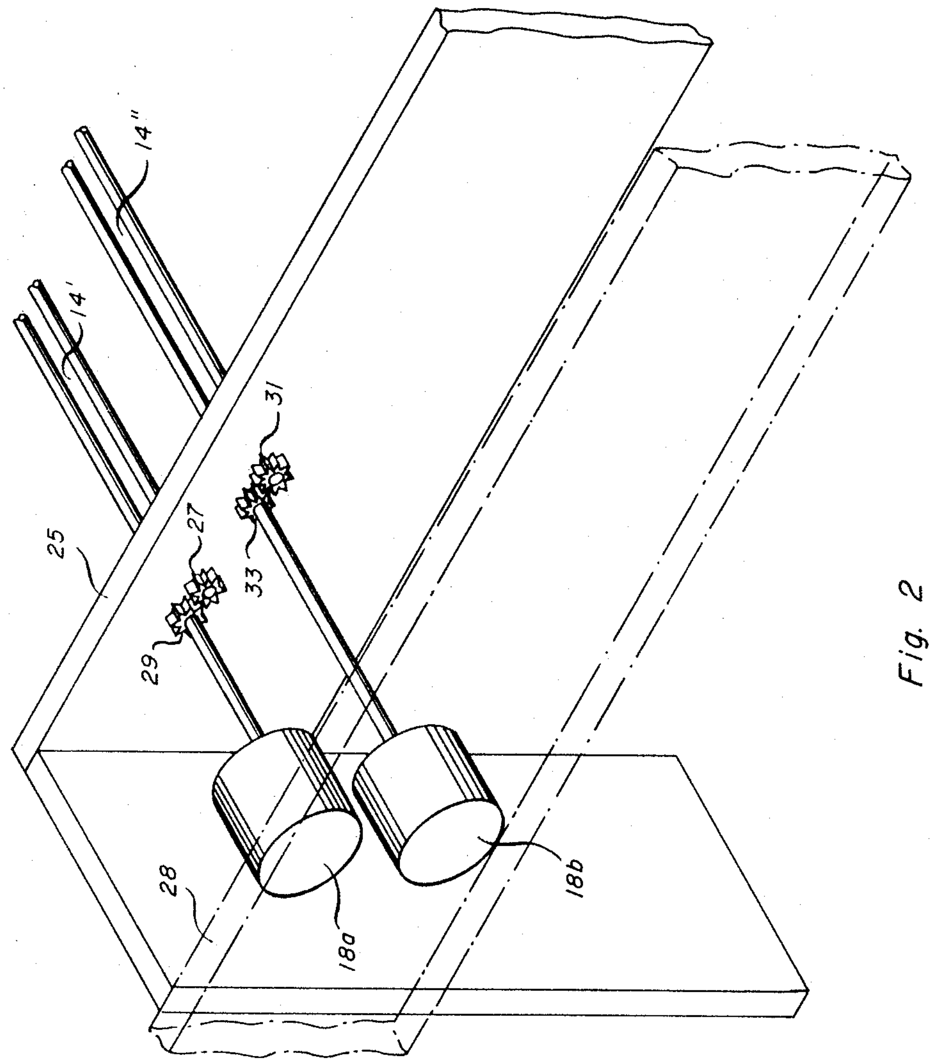
FIGURE 2 illustrates in greater detail portions of the apparatus of FIGURE 1.

FIGURE 2 illustrates in greater detail the mounting of the solenoids 18 as well as the manner in which they are coupled to the selection rods 14. As shown, the solenoids are mounted in staggered arrangement on the plate 28 for the sake of preserving space. Thus, the solenoid 18*a* is mounted on the front surface of the plate 28 and the solenoid 18*b* is mounted on the rear surface. The corresponding pair of selection rods 14′ is seen to extend through the plate 25 where one of the rods terminates and has a gear 27 mounted thereon. The other rod of the pair 14′ continues and is mechanically coupled to the solenoid 18*a* which is adapted to impart rotational motion to the rod. The last-mentioned rod further carries a gear 29 which mates with the aforesaid gear 27 such that the rods of the pair 14′ rotate in opposite directions when the solenoid 18*a* is energized. In similar manner, the rods of the pair 14″ extend through the plate 25, one rod terminating there and carrying the gear 31. The other rod continues through the plate 28 to the solenoid 18*b* to which it is mechanically coupled. The latter rod further carries the gear 33 which mates with the gear 31 so as to rotate the selection rods 14″ in opposite directions when the actuator 18*b* is energized.

FIGURE 3 illustrates in detail pertinent aspects of a referenced embodiment of the present invention. An exemplary card 10 is illustrated which, due to the limited space available, is shown foreshortened in length as well as in height. As in FIGURE 1, only three notch pairs are illustrated along the upper card edge 17, it being understood that the number of notch pairs is determined by the number of cards in the stack from which a card must be selected at random. Each notch pair contains notches of a first and of a second kind respectively, which are sequenced in accordance with the binary digit represented by the notch pair. Thus, the notch A′ of the notch pair A, A′ is seen to have a generally U-shaped configuration with a notch entrance that widens progressively in the direction of the upper edge 17 by virtue of a slanted edge portion 8. The notch A′ terminates in an arcurate portion, the width of the notch being equal to twice the arc radius.

The notch A differs in its configuration from the notch A′ by the presence of a tab 86. The tab is in part defined by the aforesaid arc and further by the edge 17, as well as an edge portion 88 normal to the latter. The tab effectively constricts the notch entrance at its narrowest portion to a distance slightly larger than the aforesaid arc radius. As in the case of the notch A′, a slanting edge portion 84, positioned opposite the tab, progressively widens the notch entrance in the direction of the upper card edge 17.

By definition, the sequence of notches of a first and of a second kind, as illustrated by the notch pair A, A′, is representative of a binary 0. This is indicated in FIGURE 3 by the designation appearing above the card edge 17. In similar manner, a notch pair B, B′ contains notches of a first and of a second kind sequenced to represent a binary 0.

In the example under consideration, the notch pairs A, A′ and B, B′ represent the address code of the card 10 shown in FIGURE 3. As previously explained, the number of notch pairs will depend on the total number of cards in the stack from which a random access card selection must be made. If the address code of a card has $n$ digits, the total number of cards in the stack from which a random selection can be made is represented by the number $2^n$. In the present example, $n=2$ and a random access card selection can therefore be made from four different cards.

In accordance with the present invention, an $m$-digit check code is appended to each address code to guarantee that successive codes differ from each other by at least two binary digits. In a preferred embodiment of the invention, the check code consists of a single parity digit which, for the sake of the discussion herein will be assumed to be odd. Thus, with an address code of 00 for card 10 in FIGURE 3, a parity digit which is binary 1 is required, as represented by the notch pair P, P′. In the latter notch pair, a notch of a second kind precedes a notch of a first kind, i.e., the notch sequence of the pair is opposite to that shown for the notch pairs A, A′ or B, B′ respectively.

As previously explained, a pair of selection rods engages each notch pair in either card-retaining or card-releasing relationship. In FIGURE 3, a pair of selection rods $a$, $a'$ is seen to engage the notches A, A′ in card-releasing relationship. Specifically, the selection rod $a$ which has a D-shaped cross section, is positioned in a 90° position such that its flat surface portion clears the tab edge portion 88 in a vertical direction. The selection rod $a'$ is seen to have a rotational position which is displaced by 45° from that of the selection rod $a$. Since the notch A′ has no tab, the selection rod $a'$ clears the sides of the latter slot. The rotational state of the selection rod pair $a$, $a'$ is referred to as the "0" state and is so indicated in FIGURE 3. It will be noted the binary digital significance of this rotational state corresponds to the binary digit represented by the notch pair A, A′.

The notch pair B, B′ is engaged by a pair of selection rods $b$, $b'$ whose rotational state is designated as binary 1. The latter rotational state is seen to differ from that of the selection rods $a$, $a'$ insofar as the first rod (the rod $b$), is now rotated to a 45° position, while the rod $b'$ assumes a 90° position, i.e., a position wherein the flat rod surface portion is vertical. It will be noted that the binary digit significance of this rotational state is binary 1, i.e., it is opposite to that represented by the notch pair B, B′. The notch B′, being U-shaped, is cleared by the selection rod $b'$, regardless of the position of the latter. The selection rod $b$, however, is seen to interfere with the tab 86 of the notch B. Accordingly, the selection rods $b$, $b'$ engage the notch pair B, B′ in card-retaining relationship.

The notch pair P, P′ is engaged by a pair of selection rods $p$, $p'$ whose rotational state is binary 0, in the same manner as the illustrated rotational state of the rods $a$, $a'$. In view of the fact that the binary digit significance of this rotational state is opposite to the binary digit represented by the notch pair P, P′, the rod pair $p$, $p'$ engages the latter notch pair in card-retaining relationship. Specifically, this is indicated by the interference of the selection rod $p'$ with the tab 86 of the notch P′, the rod $p'$ being positioned at a 45° angle.

From the foregoing explanation, it will be clear that two of the notch pairs of the card 10 are engaged in card-retaining relationship by corresponding pairs of selection rods. Specifically, the selection rods $b$ and $p'$ are adapted to retain the card against dropping, owing to their 45° rotational positions which cause the rods to interfere with the tabs of the notches B and P′ respectively.

Each selection rod has two rotational positions, approximately 45° apart, to which it may be selectively rotated. Owing to the arrangement illustrated in FIGURE 2, a pair of rods must always rotate simultaneously and in opposite directions. The action of the connected actuators which are spring-returned to a start position, causes each selection rod pair to assume a normal "0" state, e.g., as shown by the rods $a$, $a'$ in FIGURE 3. When the corresponding actuator is energized, the rod pair rotates to the "1" rotational state in which the rod $a$ assumes a 45° rotational position and the rod $a'$ assumes a 90° rotational position.

As explained above, a pair of holding rods, designated 12$a$ and 12$b$ in FIGURE 3, engages a pair of notches 15$a$ and 15$b$ in the side edges of the card in the normal position of the holding rods. In a preferred embodiment of the invention, the holding rods which similarly have a D-shaped cross section, engage the slots 15$a$ and 15$b$ in card-supporting relationship such that the selection rods are out of physical contact with the interior of the card notches through which they extend. In this manner, the wear of the card notches is minimized and ambiguous selection situations, due to an absence of perfect synchronism in the rotation of the respective selection rods, are avoided.

Figure 4:
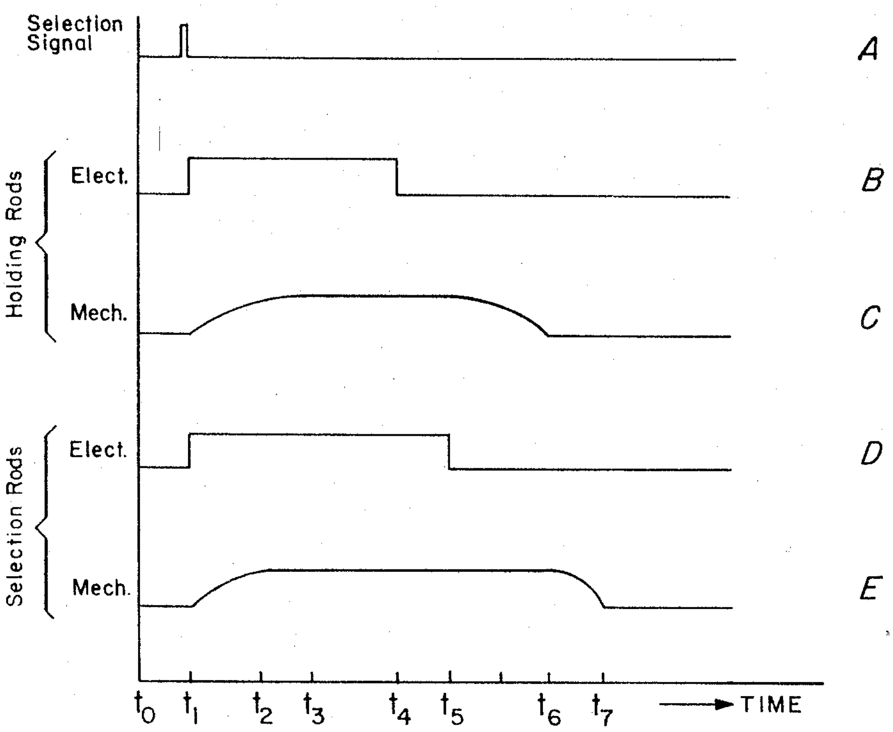
FIGURE 4 illustrates timing diagrams applicable to the operation of the apparatus of FIGURE 1.
Figure 5:
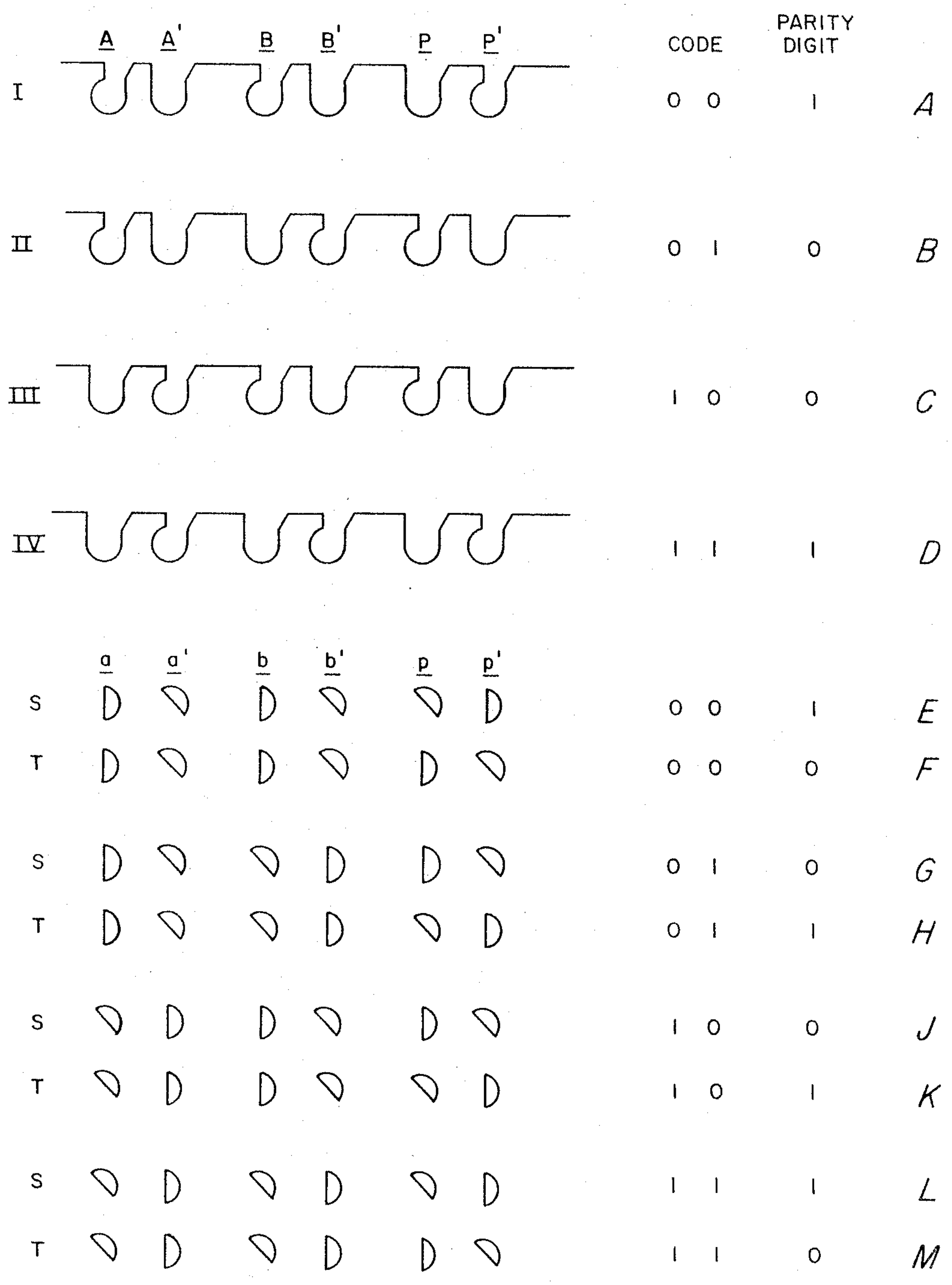
FIGURE 5 illustrates the notched pairs and various selection conditions of the illustrated example.

A typical card selection operation will now be explained with the aid of the timing diagrams shown in FIGURE 4. It is assumed that the card 10 in FIGURE 3, whose address code is 001, is to be selected. As previously explained, each selection rod pair is normally positioned in its "0" rotational state. Thus, the application of an address code selection signal 001 to the actuators, will only cause the rod pair $p$, $p'$ to rotate to its "1" rotational state. The rods must remain in the position to which they are rotated for a time interval sufficient to permit the selected card to drop. Accordingly, the energizing signals must be applied to the appropriate rod actuators throughout a time period spanning said interval. This is illustrated in greater detail in FIGURE 4.

FIGURE 4A shows the selection signal as occurring at time $t_1$. The selection signal triggers appropriate timing circuits, e.g., one-shot multivibrators, each of which is associated with a single actuator. The period of the one-shot associated with each holding rod actuator is illustrated in FIGURE 4B and may be of the order of 20 milliseconds in a practical embodiment of the present invention. FIGURE 4D illustrates the period of the one-shot associated with each selection rod actuator and is seen to be of the order of 25 milliseconds in a practical embodiment of the invention. FIGURE 4E illustrates a mechanical response of each selection rod actuator.

It will be seen that the actuated selection rods, the rods $p$, $p'$ in the present example, reach the "1" rotational state at time $t_2$, i.e., approximately 7 milliseconds following their initial energization. The holding rod actuators, being of larger size due to the fact that the holding rods must support all the cards of a stack, have a slower response and reach their final position, approximately 45° away, only at time $t_3$. This is approximately 12 milliseconds after their initial energization, the holding rods now having their flat rod surface portions substantially vertical so as to completely clear the slots 15. It follows from the foregoing discussion, that the rotation of the selection rods is completed approximately five milliseconds ahead of the completion of the corresponding action of the holding rods. Accordingly, the rotation of the selection rods takes place out of physical contact with the card notches through which they extend so that notch wear is minimized.

When the holding rods reach their 90° position at time $t_3$, the selected card 10 drops to the waiting platform below. At time $t_4$, the energization of the holding rod actuators is terminated, as shown in FIGURE 4B. At time $t_5$ the energization of the selection rod actuators is terminated, as shown in FIGURE 4D. The holding rods reach their normal position in engagement with the card slots 15 at time $t_6$, while the selection rods P, P′ return to their normal position at time $t_7$, i.e., approximately 5 milliseconds later. As a consequence, the holding rods again support the cards in the stack, prior to the initiation of the return rotation of the selection rods. In this manner, notch wear is again minimized.

As previously explained, for an $n$-digit address code, a unique random card selection can be made from a stack of $2^n$ cards. In such an arrangement, successive address codes may differ from each other by only a single binary digit. If the tab of the critical notch is broken in such an arrangement, i.e., the tab of the sole notch which is engaged in card-retaining relationship by a selection rod, the card missing this tab may be erroneously selected together with an addressed card whose address code differs by only a single digit. In accordance with the present invention, the addition of the parity digit to the $n$-digit address code provides a safeguard against such an occurrence since each non-selected card is retained by at least two notches. The likelihood of both tabs of the critical notches being broken is relatively remote.

If only a single notch tab of the two critical notches is broken, the card is still retained against falling. Excessive tilting of the card about the single selection rod by which it is retained, is prevented by the presence of the guides 7$a$ and 7$b$. As can be seen from FIGURE 3, the guide surfaces 9$a$ and 9$b$ are closely spaced to the upper card edge 17, but permitting motion of the cards along the rods. The guide surfaces are coplanar and straddle the side edges of the card. For example, let it be assumed that the card 10 in FIGURE 3 has not been selected and that the tab 86 of the notch B is broken. Once the holding rods 12 have rotated out of engagement with the slots 15 in such a case, the card 10 is retained only by the selection rod *p'*. The pivoting action of the card about the selection rod *p'* will cause the upper right hand card corner to ride up into contact with the guide surface 9*b*. The maximum permissible tilt angle under these conditions is such that the holding rod 12*a* is again able to re-engage the slot 15*a* following the card selection.

In the example under consideration, $n=2$ so that the maximum number of cards from which a selection can be made is 4. The representative notch pairs of these four cards, including the parity notch pair, are illustrated in FIGURES 5A through 5D. In each case, the address code represented by the notches as well as the parity digit are represented, assuming odd parity. The four cards are numbered I, II, III and IV, the notch pairs being designated A, A'; B, B' and P, P' respectively. The card I has a notch code equivalent to the code .001. The cards II, III and IV are represented by the notch codes .010; 100; and 111 respectively.

FIGURES 5E, 5G, 5J and 5L represent the selection conditions for the cards I through IV, the selection rods being designated *a, a'*; *b, b'* and *p, p'* respectively. The tabs of the notches A', B' and P' of card I, are all cleared in the vertical position of the corresponding selection rods *a, b,* and *p'*. In other words, each of the selection rod pairs *a, a'*; *b, b'* and *p, p'* engage the corresponding notch pairs A, A'; B, B' and P, P' of card I in card-releasing relationship.

It is now appropriate to review the manner in which the cards II, III and IV are retained when the selection rod pairs are in the rotational state .001, as indicated in FIGURE 5E, i.e. the selection condition for the card I. Considering first the card II, it will be noted that the notches B' and P are engaged in card-retaining relationship by the selection rods *b'* and *p*. In the card III, the notches A' and P are engaged in card-retaining relationship. Finally, in the card IV the notches A' and B' are engaged in card-retaining relationship.

The foregoing conditions are similarly applicable to the rod selection condition illustrated in FIGURE 5G for selecting the card II. In this condition, the selection rods retain the notches B and P' of the card I; the notches A' and B of the card III; and the notches A' and P' of the card IV. A similar situation holds true for the card selection conditions shown in FIGURES 5J and 5L for the cards III and IV respectively, and require no further explanation.

In accordance with the present invention, the cards are addressed by a sequence of codes such that each card is at some time retained by each of its tabs individually. If the tab is sound, the card will be retained in position with the aid of the guides 7*a* and 7*b*, as explained above in connection with FIGURE 3. If the tab is broken, the card will be dropped and can thus be rejected as unfit. The impelling bar 42 may be conveniently immobilized at this time.

To carry out this operation, the parity digit associated with each applied address code is logically inverted in the test made, as indicated in FIGURES 5F, 5H, 5K and 5M. Thus, when the selection rods are rotated to the the position shown by the test mode illustrated in FIGURE 5F, they represent the code 000, as indicated in the drawing. Since this is not a selection condition, no card should drop. The card I is retained against falling by the single notch P' which is engaged by the selection rod *p'* in card-retaining relationship. The card II is retained against falling by the single notch B'. The card III is retained against falling by the single notch A'. The tabs of these notches in the respective cards are thus being tested at this time. The card IV is retained against falling by the three notches A', B' and P'. Accordingly, this position of the selection rods is not a valid test of the card IV for broken notch tabs.

When the selection rods are rotated to the position indicated in FIGURE 5H, the card I is retained against falling by the notch tab B. The card II is retained against falling by the notch P. The card IV is retained against falling by the notch A'. All of the foregoing represent valid tests for broken notches. The card III is retained against falling by the notches A', B and P and hence it is not being tested for broken notch tabs under these conditions. Corresponding situations will be apparent with reference to the test mode selection rod positions indicated in FIGURES 5K and 5M and require no further explanation. It will be clear that for each test mode condition, a single notch tab is examined in three of the four cards. When all of the test mode address codes have been cycled through, each individual notch tab of every card will have been examined for breakage.

Figure 6:
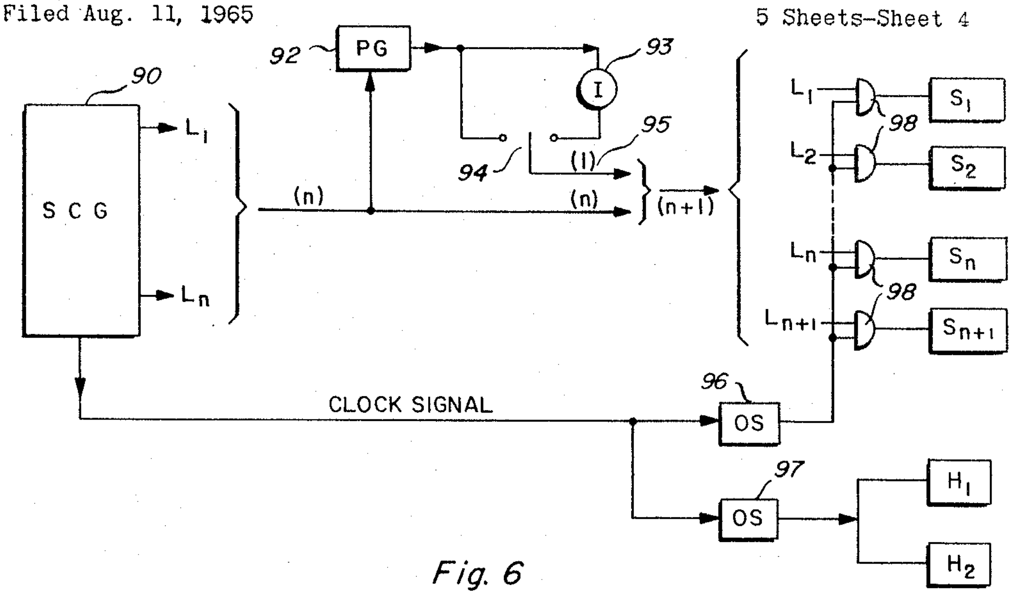
FIGURE 6 illustrates a circuit in accordance with a preferred embodiment of the present invention.

FIGURE 6 illustrates a preferred circuit for carrying out the test explained above in connection with FIGURE 5. A sequential code generator 90 is adapted to provide in sequence $2^n$ different *n*-digit address codes and to apply them to the output lines $L_1 \ldots L_n$. Additionally, the code generator 90 is adapted to provide a clock signal upon the occurrence of each address code. Each address code signal arriving on *n* lines is applied to a conventional parity generator 92 which provides a single parity digit at its output. The latter output signal is logically inverted by an inverter 93. A switch 94 is selectively adapted to switch either the generated parity digit signal or the inverted parity digit signal onto a single output line 95. The parity digit signal is combined with the *n*-digit signal from the sequential code generator 90 and is thus applied in parallel to one input of each $n+1$ gating means 98. A one-shot multivibrator 96 receives the aforesaid clock signal as an input and has its output connected to a second input of each gating means 98. The output of the latter is connected to selection rod actuators $S \ldots S_n, S_{n+1}$ respectively, which are mechanically coupled to the selection rods, as explained above. The one-shot multivibrator 96 may have a period of approximately 25 milliseconds in a practical embodiment of the present invention, as explained in connection with the discussion of FIGURE 4.

A one-shot multivibrator 97 may, in a practical embodiment of the present invention, have a period of 20 milliseconds, as explained in connection with FIGURE 4. The one-shot 97 is connected to a pair of holding rod actuators $H_1$ and $H_2$ respectively which, in turn, are mechanically coupled to the holding rods, as explained above.

Under normal selection conditions, the input lines $L_1 \ldots L_n$ receive address selection codes in accordance with the card it is desired to select. Under these conditions, the switch 94 is connected directly to the output of the parity generator 92, so that he signals applied to the gating means 98 correspond to the address selection code and to the parity digit generated in response thereto. Upon the occurrence of an address code, a clock signal is generated and the multivibrator 96 becomes active. Accordingly, the selection rod actuators $S_1 \ldots S_{n+1}$ are appropriately energized for a card selection. The clock signal is further buffered to the one-shot multivibrator 97 which energizes the holding rod actuators $H_1$ and $H_2$. This action causes the holding rods to become disengaged from the card slots. The relative timing of the actuators during a card selection occurs in accordance with the explanation above relative to the timing diagrams of FIGURE 4.

If the apparatus of FIGURE 6 is to be operated in the test mode, the switch 94 is moved to the right so that an inverted parity digit signal is applied to the line 95 for each address code. The code generator 90 then cycles through $2^n$ *n*-digit address codes. Through action of the gates 98 and the one-shot multivibrator 96 the actuators $S_1 \ldots S_{n+1}$ are now energized in accordance with the test mode conditions outlined with respect to the discussion of FIGURES 5F, 5H, 5K and 5M. Again, each clock signal causes the holding rods to rotate out of engagement with the slots 15, following the rotation of the selection rods for each applied code. In this manner, a defective card is permitted to drop and can be readily removed. Before the next address code in the sequence is applied, the holding rods rotate back into engagement with the card slots.

From the foregoing discussion, it will be apparent that the present invention provides apparatus for selecting and for systematically testing the record cards employed in a random access card memory for physical damage, both operations being carried out with a greater degree of reliability than was heretofore possible. The testing operation can be carried out without the necessity for manually removing the cards from their normal storage location and for visually inspecting them. The operation, once initiated, is automatic and is capable of cycling through an entire card stack of $2^n$ cards, substantially in a time interval no greater than is required to make $2^n$ card selections.

It will be apparent that the invention is not limited to the preferred embodiment illustrated and described. The use of an $m$-digit code in lieu of a single parity digit has already been explained. Similarly, the invention is applicable to an arrangement wherein each card notch has opposite sides that are respectively representative of opposite binary digits. The selectiton rods in such an arrangement have corresponding cross sections adapted to cooperate with such notches. Thus, from the foregoing disclosure of the present invention, it will be apparent that numerous modifications, departures, substitutions and equivalents will now occur to those skilled in the art, all of which fall within the true spirit and scope contemplated by the present invention, as defined by the appended claims.

What is claimed is:

1. Apparatus for checking a plurality of normally suspended record cards each having $n+m$ notch pairs successively positioned along the upper card edge where $n$ and $m$ are integers each greater than 0, said $n+m$ notch pairs being individually representative of a first or a second binary digit and being jointly representative of an $n$-digit address code unique to said card and an $m$-digit check code uniquely associated with each address code, comprising selection rod pairs each normally assuming a first rotational state and each being adapted to engage correspondingly positioned notch pairs of all of said cards, at least two of said notch pairs in each suspended card normally being engaged in card-retaining relationship by separate rod pairs, actuating means associated with each of said selection rod pairs and adapted to rotate the latter to a second rotational state, means for sequentially generating parallel, $n$-digit selection signals representative of the address codes of each of said plurality of cards, means responsive to each of said selection signals for deriving a check code signal, means for modifying said check code signal, and means for energizing said selection rod actuating means with each of said sequentially generated selection signals and with the associated modified check code signal, said last recited energization of said actuating means successively causing each of said plurality of cards to be retained by the action of a single rod pair.

2. The apparatus of claim 1 wherein said $m$-digit check code represents a single parity digit, said means for modifying said check code signal comprising means for logically inverting said parity digit signal.

3. The apparatus of claim 1 wherein each of said cards has a pair of side edges containing opposite slots near said upper card edge, and further including a pair of holding rods normally engaging said slots of each card, actuating means coupled to said holding rods and responsively energized by each selection signal to rotate said holding rods out of engagement with said slots, and timing means effective to initiate the rotation of said holding rods out of engagement with said slots only upon the completion of the rotation of the actuated selection rod pairs to said second rotational state, said timing means being further effective to initiate the return rotation of said selection rods to said first rotational state only upon the completion of the return rotation of said holding rods into engagement with said slots.

4. The apparatus of claim 1 and further including means for constraining the tilt angle of a card retained by a single rod pair.

5. Apparatus for checking up to $2^n$ record cards where $n$ is an integer greater than 0, said cards being vertically suspended in a stack from which they may be randomly selected by dropping, one edge of each suspended card being positioned in a common horizontal plane.

separate notch means successively disposed along the said edge of each card, each of said notch means being of a first or of a second kind representative of a first or of a second binary digit respectively, said notch means of each card jointly representing one of $2^n$ different $n$-digit address codes together with at least one check digit associated with each code, correspondingly positioned notch means of successive suspended cards being aligned in rows, selection rod means respectively engaging said rows of notch means, separate actuating means coupled to each of said rod means and normally adapted to hold the latter in a first rotational state, means for receiving an $n$-digit address code selection signal on $n$ parallel lines, means responsive to each of said selection signals to generate a check digit signal, means responsive to a selection signal and to the corresponding check digit signal for energizing addressed ones of said actuating means, said energized actuating means rotating the associated selection rod means to a second rotational state adapted to release the card addressed by said selection signal, said rod means being adapted when in said first rotational state to engage notch means of said first kind only in card-retaining relationship, and being further adapted, when in said second rotational state to engage notch means of said second kind only in card-retaining relationship, at least two notch means of each suspended card normally being engaged in card-retaining relationship by separate ones of said selection rod means, means for sequentially generating $2^n$ different address code selection signals and for applying them to said receiving means, means for logically inverting each of said check digit signals, means selectively operative to apply said inverted check digit signals to said actuating means in place of the check digit signals associated with each of said sequentially generated selection signals, said last-recited action successively causing different cards in said stack to be retained by a single rod means, and means for preventing the excessive tilting of any card retained by a single rod means.

6. The apparatus of claim 5 wherein said check digit generating means is responsive to each of said selection signals to generate a single parity digit, said notch means successively disposed along said card edge numbering $n+1$.

7. The apparatus of claim 6 wherein each of said notch means includes a pair of notches having different configurations, notch means of said first and second kind differing from each other by the sequence in which said differently configured notches appear in the notch pair.

8. The apparatus of claim 7 wherein one notch of each of said pair of notches includes a tab, each of said rod means including a pair of rods adapted to engage a pair of notches, the rods of each pair being adapted to rotate jointly and respectively having first and second mutually displaced rotational positions in said first rotational state and having second and first rotational positions respectively in said second rotational state, each of said rods having a cross section enabling it to rotate under said tab of any tab-bearing notch engaged thereby to establish said card-retaining relationship therewith.

9. The apparatus of claim 6 wherein said cards are substantially rectangular, the major edges of said suspended cards being positioned substantially horizontally,
a pair of opposite slots positioned in the side edges of each card near the notched major edge to form aligned slot rows in said stack,
a pair of holding rods normally engaging said slot rows,
actuating means coupled to said holding rods and responsively energized by each selection signal to rotate said holding rods out of engagement with said slots,
and timing means effective to cause the rotation of the actuated selection rod means to said second rotational state to be completed prior to initiating the rotation of said holding rods out of engagement with said slots, said timing means being adapted to maintain the energization of said actuating means for a period adequate to permit a selected card to drop from said stack.

10. The apparatus of claim 9 wherein said holding rods normally engage said slots in card-supporting relationship such that said selection rod means are out of physical contact with the notch means engaged thereby,
said timing means being further effective to cause the return rotation of said holding rods into engagement with said slots to be completed prior to initiating the return rotation of said selection rod means to said first rotational state.

11. The apparatus of claim 10 wherein each of said selection rod actuating means includes gating means having first and second inputs, each of said first inputs being connected to receive an appropriate one of said energizing signals,
said timing means including first and second one-shot multivibrators each connected to receive a clock signal upon the occurrence of each of said sequentially generated codes,
means for coupling the output of said first multivibrator to each of said second inputs of said gating means,
and means for coupling the output of said second multivibrator to said holding rod actuating means.

12. The apparatus of claim 8 and further including means for preventing the excessive tilting out of its normal suspended position of any card retained by a single rod means.

13. The apparatus of claim 12 wherein said cards are substantially rectangular, the major edges of said suspended cards being positioned horizontally, said tilt preventing means including a pair of horizontal guide surfaces positioned immediately above said common plane but out of contact with the notched edges of said normally suspended cards, each of said guide surfaces straddling a side edge of each suspended card.

References Cited by the Examiner

UNITED STATES PATENTS

| | | | |
|---|---|---|---|
| 2,602,451 | 7/1952 | Hofgaard | 129—16.1 |
| 3,105,593 | 10/1963 | Fredkin | 209—110 |
| 3,184,724 | 5/1965 | Irasek | 129—16.1 X |
| 3,267,939 | 8/1966 | Ford et al. | 129—16.1 X |

FOREIGN PATENTS

| | | |
|---|---|---|
| 614,436 | 12/1948 | Great Britain. |

JEROME SCHNALL, *Primary Examiner.*